INVENTORS
LAWRENCE H. JOHNSTON
BY WILLIAM B. PIERCE

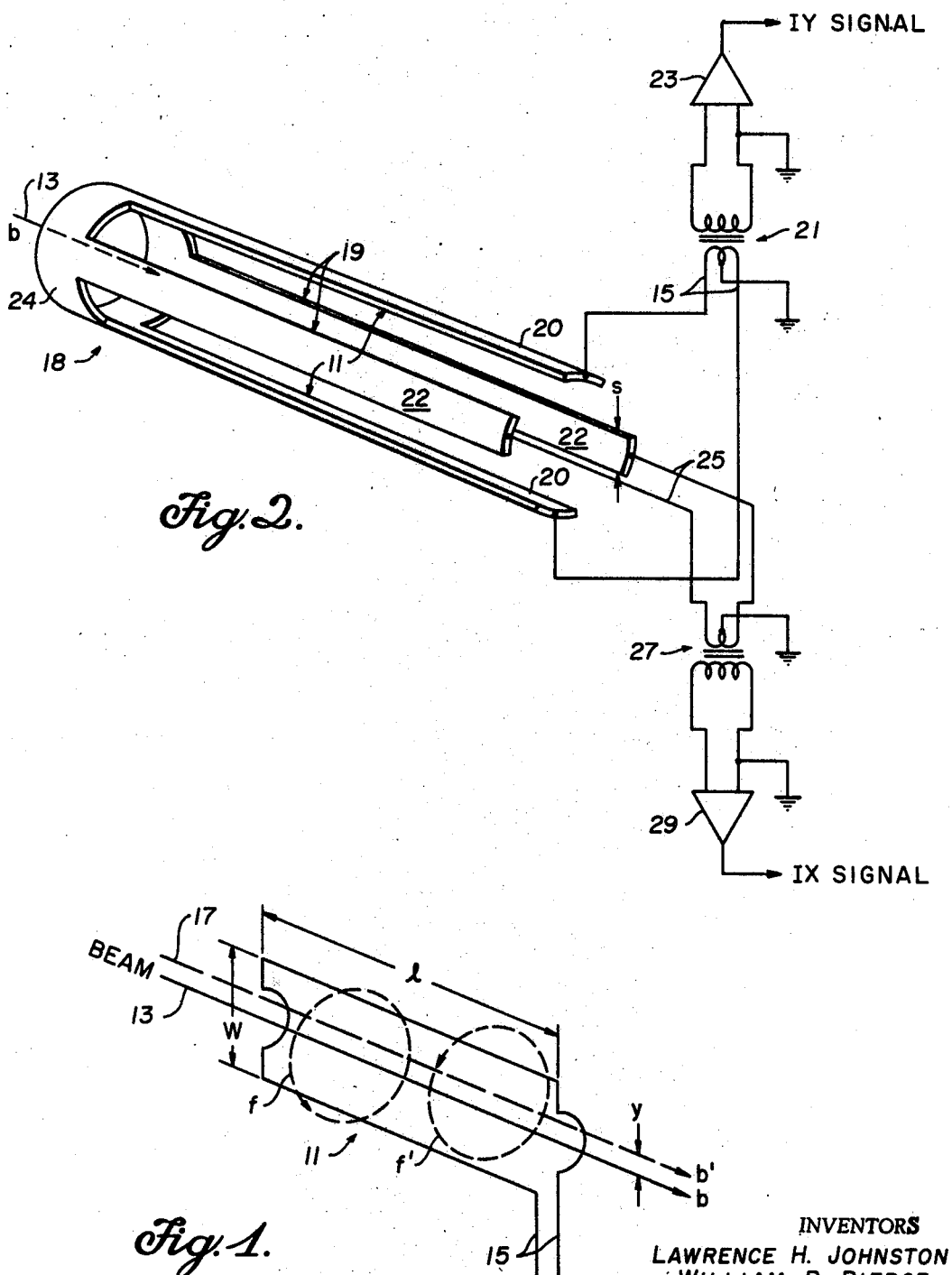

Roland G. Anderson
ATTORNEY 3,496,463
POSITION MONITORING SYSTEM FOR A PULSE-MODULATED CHARGED PARTICLE BEAM
Lawrence H. Johnston, Moscow, Idaho, and William B. Pierce, Los Altos, Calif., assignors to the United States of America as represented by the United States Atomic Energy Commission
Filed Mar. 1, 1968, Ser. No. 709,625
Int. Cl. G01n 27/00
U.S. Cl. 324—71                     9 Claims

ABSTRACT OF THE DISCLOSURE

A beam position-monitoring system, including an inductive pickup made of an electrically conductive tubular section with portions removed, leaving four longitudinal plates connected as orthogonal loops with central axes coincident with the central path of the beam, and an inverse gain circuit for normalizing output signals from respective loops to be proportional only to the beam position with respect to the central path.

Background of the invention

The present invention relates generally to systems for monitoring the position of high-energy charged particle beams, and more particularly, it pertains to a monitoring system including an especially designed inductive pickup coupled to a pulse-normalizing circuit for producing pulses which are proportional solely to the beam position.

The invention disclosed herein was made under, or in, the course of Contract No. AT(04-3)-400 with the United States Atomic Energy Commission.

Various types of monitors for detecting the position of a charged particle beam are known in the art. Among these known monitors are mechanical scanning types in which a scanning element is periodically and transversely passed through a beam of relatively low intensity. A wide variety of non-intercepting beam position monitoring systems have also been utilized heretofore. Such systems include, for example, sensing and reference cavities, electrostatic sensing elements, loop pickups situated in microwave cavities, orthogonal plural turn coil pickups of complex nature, etc. These prior systems are subject to various difficulties and limitations, collectively or individually, such as low sensitivity, complexity, high noise levels, and complex electronic circuitry.

Summary of the invention

According to the present invention, a beam position-monitoring system is provided with a magnetic pickup that is formed of pairs of longitudinal electrically conductive plates annularly arranged about the central path of a pulse-modulated charged particle beam. Opposing plates are electrically connected together at one end and open at the other, to constitute single turn loops. The closed ends are formed as an aperture for passage of the beam. The particular configuration of the pickup is advantageous for several reasons. The pickup may be easily supported immediately adjacent the beam path to thereby maximize the mutual inductance between the beam and the pickup. Furthermore, the self-inductance of the pickup is minimized by each loop being only a single turn and being made of wide conductors. A large mutual inductance and low self-inductance maximizes the power output and therefore the resolution and sensitivity of the pickup. The pickup configuration also results in an easily mounted pickup having a conveniently large beam aperture which is easily adjusted to a fixed reference position with respect to the central beam path. Upon deviation of the beam from the central path, a net beam position-intensity related signal is induced in each pickup loop. The signal is proportional to the product of beam current times beam displacement from the plane of the loop. Signals are induced in the pickup loops only at the end of the beam bunches, due to the inductive nature of the loops. The position-intensity signals are first amplified and then applied to an integrating circuit which filters out noise and produces an output pulse corresponding to the shape of the beam pulses. Next, the beam current component is separated from each integrated position-intensity signal. This is accomplished with a toroidal pickup coil located adjacent the beam path for developing an intensity signal which is amplified, then integrated, and then amplified again in such a way as to give a nearly constant inverse intensity signal. The inverse signal is divided into each integrated position-intensity signal to give a final output signal from each loop that is proportional only to the beam position, thereby precisely defining the beam position with respect to the central path.

An object of the invention is to provide an improved charged particle beam position-monitoring system useful for indicating the position of a very high-intensity, high-energy charged particle beam with respect to a central path.

Another object of the invention is a charged particle beam position-monitoring system that is sensitive, accurate, simple, rugged, reliable, and inexpensive.

Another object of the invention is to detect the position of a pulse-modulated charged particle beam with a non-intercepting magnetic pickup having a high mutual inductance, a low self-inductance and a large beam aperture.

Another object is to continuously divide a beam intensity signal component from beam position-intensity signals to give a position signal proportional only to the deviation of a charged particle beam from its central path.

Other objects and advantageous features of the invention will be apparent in a description of a specific embodiment thereof, given by way of example only, to enable one skilled in the art to readily practice the invention, and described hereinafter with reference to the accompanying drawing.

Brief description of the drawing

FIGURE 1 is a simplified, schematic diagram of a single-turn loop, illustrating the principle of operation of a magnetic pickup according to the invention.

FIGURE 2 is a perspective view of a magnetic pickup device of a charged particle beam position monitor according to the invention.

Description of an embodiment

Figure 3:
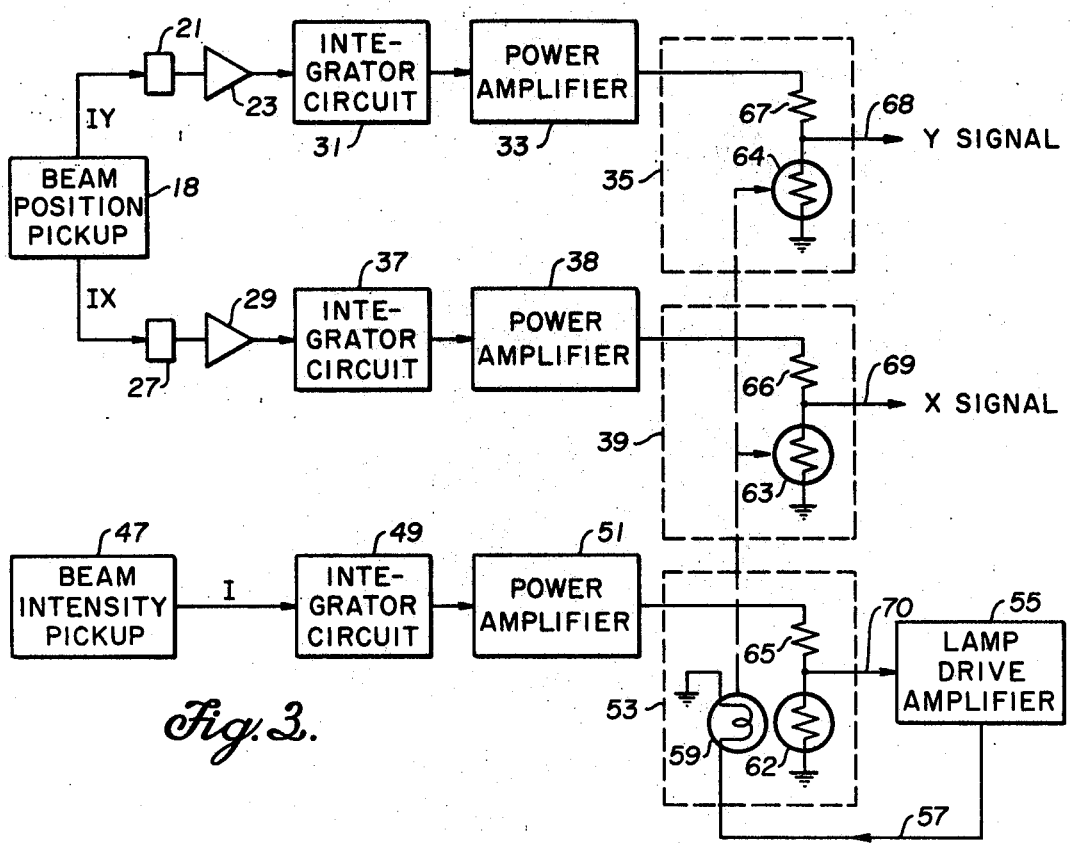
FIGURE 3 is a block diagram of the main components of a charged particle beam position monitor according to the invention.

The principle of operation of a magnetic pickup utilized in accordance with the invention may be explained with reference to FIGURE 1, wherein is shown an electrically conducting single-turn pickup loop 11. The coil is terminated with output leads 15, and is positioned to have its central axis coincide with a charged particle beam, $b$, along its central path 13. The ends of the loop 11 are bent to form apertures for free passage of the beam. The beam 13 constitutes an electric current, and when directed along the central path 13, a magnetic field, $f$, is developed thereabout. The field, $f$, is comprised of flux lines which equally enclose the upper and lower sides of the loop 11. The EMF (electromotive force) induced in the upper side therefore is equal to the EMF induced in the lower side, but of opposite polarity, and therefore the resultant net EMF developed across the leads 15 is zero. Deviation of the beam, $b$, in the vertical direction, for example, to become beam, $b'$, along path 17, offset a distance, $y$, from the path 13, causes the magnetic field surrounding the beam to shift to a second position, $f'$. With the beam in this position, more lines of flux intersect the upper side of the loop 11 than intersect the lower side. A greater EMF is induced thereby in the upper side of the loop than in the lower side, resulting in a net difference EMF across the output leads 15. Thus, the deviation of the beam, $b$, from the central path 13 in any direction that includes a vertical component will produce a net EMF output across the leads 15 of an amplitude and polarity corresponding to the direction and amount of vertical offset. By adding a second pickup loop, oriented at 90° with respect to the loop 11, with its central axis coincident with the central path 13 of the beam, $b$, signals corresponding to a horizontal deviation of the beam may be obtained.

In FIGURE 2, a magnetic beam position pickup 18 is shown in which the loop 11 is combined with a second pickup loop 19. The pickup 18 may be made of separate conductors, but is particularly adaptable for being made from a single piece of electrically conducting material, as for example a copper tube in which portions are removed leaving parallel plates 20 and 22, terminating in a base 24 that is common to both of the loops. The loops 11 and 19 define an aperture for the beam, and are therefore positioned as close to the beam as possible. The intimate electrical and mechanical connection of the two loops at the closed base end produces no cross talk between the signals induced therein. This is because each loop is connected at the balanced center of the other loop.

The amount of electrical power induced by the beam in each loop 11 and 19 depends directly on the mutual inductance between the loop and the charged particle beam. The amount of induced power also depends inversely on the self-inductance of the loops. The mutual inductance between the beam current and the magnetic pickup may be expressed as:

$$M = 8 \cdot 10^{-9} ly/W \text{ henries} \quad (1)$$

where $y \ll W$; and the self-inductance of each loop may be expressed as:

$$L = 0.004 \cdot l \cdot \log_e(2W/S) \text{ henries} \quad (2)$$

where $l$ is the length of one side of the loop parallel to the beam path, $y$ is the deviation of the beam from the central path, $W$ is the width of each loop transverse to the beam path, and $S$ is the width of the conductor of each loop, and $l$, $y$, $W$ and $S$ are measured in centimeters.

The power output from each loop is:

$$P_\omega = (M^2/L) \omega i_{b\omega}^2 \cos \phi \text{ watts} \quad (3)$$

where $\omega$ refers to any frequency component of the beam current, $i_{b\omega}$ is the beam current, and $\cos \phi$ is the power factor which results from the loading placed across each pickup loop.

Since the output power ($P_\omega$, Equation 3) is directly proportional to the square of the mutual inductance ($M^2$) and inversely proportional to the self-inductance ($L$), the output power may be maximized by making the mutual inductance large and the self-inductance small. Referring to Equation 1 for mutual inductance, it is seen that $l$ should be made long and $W$ should be made small in order to obtain a large value for $M$. The magnetic pickup 18 has an ideal geometric configuration to give each loop a long length and a narrow width.

Referring to Equation 2 for self-inductance $L$, it is seen that $L$ is directly proportional to $l$ and $W$, and inversely proportional to $S$. Again, the geometry of the pickup 18 is ideal. The self-inductance may be easily minimized, since the width $S$ of each loop conductor can easily be made wide and the width $W$ of the loop may be made small to obtain a low self-inductance, just as it is desirable, referring to Equation 1, to make the width of the loop small to obtain a high mutual inductance. Although increasing the length $l$ of a loop side increases the self-inductance, the mutual inductance increase is proportional to the square of the length so that a net advantage is obtained by using loops with long lengths.

With reference to Equation 1 for mutual inductance, it is seen that the mutual inductance is dependent upon the magnitude of the variable $y$ in the case of the loop 11, or in the case of the loop 19, a variable in the horizontal direction which may be designated as $x$. Consequently, when the central axis of a loop coincides with the central path of the beam, the variable $x$ or $y$ is zero and the mutual inductance is zero. Reference to Equation 3 indicates that the power output is dependent on the mutual inductance, and therefore it will also be zero when the variable $x$ or $y$ is zero.

Reference to Equation 3 indicates that the power output from each loop is dependent on two variables, the distance $x$ or $y$ from the central path and the beam current $i_{b\omega}$. The output signals from the loops 11 and 19 may then be referred to as IY and IX signals respectively.

The IY signals are applied over the leads 15 (FIG. 2) to a stepup transformer 21. The IY signal voltage is raised by the stepup transformer 21 and applied to a preamplifier 23 for amplification to a suitable level for later processing.

Similarly, the IX signal is applied to a stepup transformer 27 which raises the signal voltage IX for application to a preamplifier 29 to produce an amplified signal IX.

Prior art magnetic pickups have utilized plural-turn pickup coils instead of a stepup transformer. A plural-turn pickup coil, however, has an intra turn capacitance which causes a much lower ringing frequency, and consequent distortion, than obtained with a single-turn loop according to this invention. Since pulse transformers of nearly ideal properties are readily available, a distinct advantage is gained in using a stepup transformer rather than a multiple-turn magnetic pickup coil.

In FIGURE 3, the pickup 18, transformer 21 and preamplifier 23 are shown in block diagram in conjunction with a conventional integrator circuit 31 and power amplifier 33 to which the IY signal is successively applied. The output of the amplifier 33 is applied to a division circuit 35, with which, as will be presently discussed, the I component of the IY signal is divided out to produce a Y signal that is proportional only to the distance that the beam deviates in the Y direction from its central path. Similarly, the IX signal is successively applied to the transformer 27, preamplifier 29, integrator circuit 37, power amplifier 38, and division circuit 39, to produce an X output signal proportional only to the distance the beam may deviate in the X direction from its central path.

Figure 4:
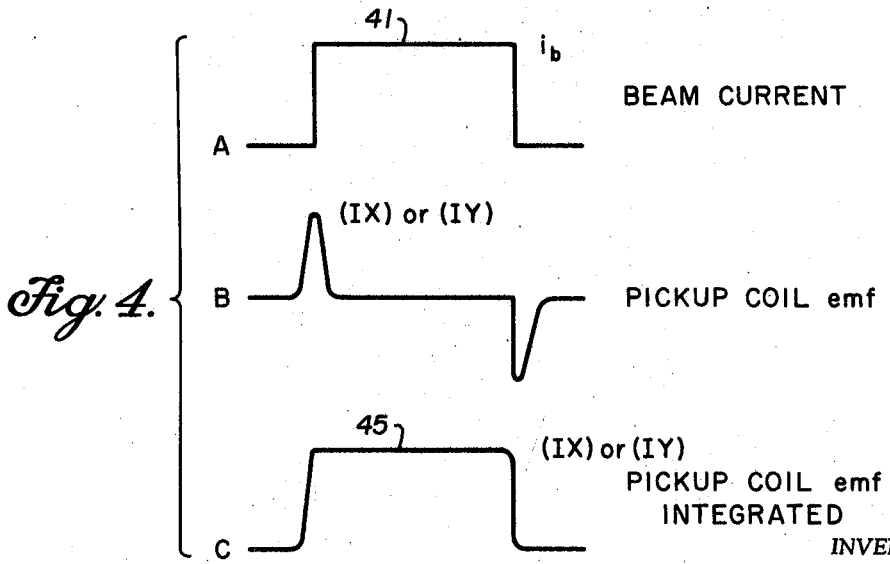
FIGURE 4 is a diagram of significant waveforms present in the beam position monitoring system of FIGURE 3.

The shape of the signal induced in the beam position pickup 18 is dependent upon the shape of the beam pulse which may have an idealized rectangular shape such as pulse 41, shown on line A of FIGURE 4 and indicated as beam current $i_b$. Such pulses may, for example, be modulated to occur at the rate of 360 per second, each pulse being comprised of charged particle bunches at a frequency of 2856 megacycles per second. In such a case, the beam position pickup 18 is sensitive only to the beginning and end of each beam pulse 41. The signal IX or IY at the output of each loop 11 or 19, therefore, has the form of the pulses shown on line B of FIGURE 4, which form is a differential of the beam pulse shown on line A. The signal IX or IY is restored to a form corresponding to the beam pulse by integrating the respective signals over the period of the beam pulse with the circuits 31 and 37. The resulting integrated IX or IY signal is shown on line C of FIGURE 4.

In order to obtain output signals which are proportional only to the deviation of the beam from its central path, it is necessary to divide the beam intensity component from the IX and IY signals. To do this, a conventional toroidal pickup coil 47 is provided to produce a beam current intensity signal I that is proportional only to the beam intensity. The I signal is applied to an integrator circuit 49 to restore it to a pulse shape corresponding to the shape of the beam pulse. The I signal is then amplified with a power amplifier 51 and the resulting signal applied to a gain control circuit 53 for control of a lamp drive amplifier 55. The output of the amplifier 55 is nearly constant, and is proportional only to the beam intensity I. This output is applied over a line 57 to a lamp 59 which is a part of the gain control circuit 53, the division circuit 39 and the division circuit 35. Also connected in each of these respective circuits are photoresistors 62, 63 and 64 which are responsive to the light from the lamp. Coupling resistors 65, 66 and 67 are serially connected with the photoresistors 62, 63 and 64 to the outputs of respective power amplifiers 51, 38 and 33. A Y signal output lead 68 is connected at the junction of the resistors 64 and 67; and an X signal output lead 69 is connected at the junction of resistors 63 and 66. An output lead 70 is connected at the junction of the resistors 62 and 65 for conducting beam intensity signals I to the input of the lamp drive amplifier 55. In practice, the photoresistors 62, 63 and 64 should be carefully mounted with respect to the lamp 59 so that each will receive the same amount of light therefrom.

In operation, the amplifier 55 is driven to have a substantially constant output due to the response of the photoresistor 62 to the lamp 59. The resistance of the photoresistor 62 is inversely proportional to the intensity of the lamp 59. Consequently, any transient increase in the I signal will cause the light output of lamp 59 to increase, lowering the resistance of the resistor 62. This causes the amplitude of the input signal to be lowered to thereby maintain the output constant. Conversely, a transient low beam intensity signal I causes the output of the amplifier 55 to be lowered and the lamp 59 to shine less brightly. This causes the resistance of the photoresistor 62 to rise and to thereby raise the amplitude of the I input signal to the amplifier 55 to maintain the output thereof constant. Thus, the output of the amplifier 55 is maintained substantially constant for transient variations of the beam intensity signal. Typically, the decay period of the amplifier 55 is about $1/10$ second, or 36 accelerator pulse periods, and results in a substantially constant output for a particular input signal level.

The circuits 35, 39 and 53 are made, as closely as possible, to be identical and to have a gain of $1/I$ on their respective output leads with respect to the signal applied to the lamp 59. Since the gain of each of the circuits 35, 39 and 53, with respect to the lamp signal, is adjusted to be $1/I$, a component I is divided out of any signals applied from the power amplifiers 33, 38 and 51 to the respective output leads 68, 69 and 70. The signals appearing on the leads 68 and 69, therefore, are proportional only to the deviation in the X and Y directions of the beam $b$ from its central path 13. The X and Y signals may be applied to an oscilloscope, or alternatively to X and Y ammeters, for direct observation of the beam position.

An embodiment exemplifying the invention was constructed in which the beam monitor 18 had the following dimensions:

a clear aperture of 3½ inches;
a length of 12 inches;
plates having a width of one inch;
a self-inductance of 0.5 microhenry;
a mutual inductance of $3.2 \cdot 10^{-8}$ henries per centimeter of beam displacement.

The stepup transformers 21 and 27 had a ratio of 10-to-1. The system was used with a charged particle beam having a cylindrical shape about ¼ inch in diameter, and comprised of nearly parallel rays. The beam was modulated to form rectangular pulses from 0.5 to 2 microseconds in length, repeated up to 360 times per second. The sensitivity of the system was about $2 \cdot 10^{-4}$ ampere-millimeters. The spatial resolution was found to be 0.1 millimeter.

What is claimed is:

1. In a monitoring system for detecting the position of a pulse-modulated charged particle beam with respect to a reference path, the combination of:
    first, second, third and fourth straight elongated electrically conductive plates each having first and second ends;
    a conductive element for electrically and mechanically interconnecting said first ends of all said plates, said element holding all said plates parallel to said reference path and equally spaced therefrom, said element holding said plates successively equally spaced around said path;
    first means connected between said ends of said first and third conductors and forming a first closed single-turn loop therewith for producing a first output signal corresponding to deviation of said beam from said path in a first direction; and
    second means connected between said second ends of said second and fourth conductors and forming a second single-turn closed loop therewith for producing a second output signal corresponding to deviation of said beam from said path in a second direction perpendicular to said first direction.

2. The combination of claim 1, wherein said conductive element interconects said first and second loops at their balanced centers.

3. The combination of claim 1, wherein said conductive element mechanically connects said conductive plates as an integral unit.

4. The combination of claim 3, including a long length of tubular electrical conductor having longitudinal portions removed to leave a short length of tubular conductor as said conductive element at one end of said long length with said plates extending individually from said element to the other end of said long length.

5. The combination of claim 1, further including:
    beam current detecting means for producing a beam intensity signal proportional to the current intensity of said beam;
    dividing means coupled to said first and second loops and said beam current detecting means for dividing the beam current intensity component from said first and second output signals to produce corresponding final output signals that are proportional solely to the amount of the deviation of said beam from said central path in said first and second directions respectively.

6. The combination of claim 5, wherein
    said dividing means includes first and second inverse gain circuits,
    said first inverse gain circuit having input connections from said first loop and said beam detecting means,
    said second inverse gain circuit having input connections from said second loop and said beam detecting means, and
    said first and second inverse gain circuits each having a reciprocal gain with respect to said beam intensity signal for producing final output signals proportional solely to the deviation of said beam from said central path.

7. The combination of claim 6, wherein
    said first gain circuit includes a first photosensitive resistor and said second gain circuit includes a second photosensitive resistor,
    said first and second gain circuits include a common lamp driven by said beam current detecting means for producing light that is proportional to the intensity of said beam, said first and second photosensitive resistors being electrically coupled to respective first and second coils of said inductive pickup, and said first and second photosensitive resistors being light coupled to said lamp and responsive thereto to inversely vary their resistance to remove the beam intensity component from respective coil signals.

8. The combination of claim 7, wherein said beam current detecting means includes:

a beam intensity pickup;

pulse shaping means coupled to the output of said beam intensity pickup for producing electrical pulses corresponding to said pulse-modulated beam;

a third photoresistor electrically coupled to said pulse shaping means and light coupled to said lamp; and a constant output amplifier having an input connected across said photoresistor and an output connected to said lamp.

9. The combination of claim 5, further including:

first and second preamplifiers;

first and second ferrite core stepup transformers connected respectively between said first loop and first preamplifier and said second loop and second preamplifier;

first and second integrator circuits coupled respectively to outputs of said first and second preamplifiers said integrator circuits being coupled respectively through first and second power amplifiers to said dividing means;

said transformers and preamplifiers being operable to raise the signals from respective loops to usable levels for driving corresponding integrator circuits.

References Cited

UNITED STATES PATENTS 3,152,238   10/1964   Anderson _____ 219—121
3,179,804    4/1965   Gibney et al. _____ 250—49.5 X

FOREIGN PATENTS 421,779    3/1947   Italy.

EDWARD E. KUBASIEWICZ, Primary Examiner

U.S. Cl. X.R.

250—49.5